US006888085B2

(12) United States Patent
Spencer et al.

(10) Patent No.: US 6,888,085 B2
(45) Date of Patent: May 3, 2005

(54) METHOD AND SYSTEM FOR DETECTION OF CONTAMINANTS IN MAIL

(75) Inventors: David W. Spencer, Avon, CT (US); Pradeep K. Das, Bethel, CT (US)

(73) Assignee: Pitney Bowes Inc., Stamford, CT (US)

( * ) Notice: Subject to any disclaimer, the term of this patent is extended or adjusted under 35 U.S.C. 154(b) by 362 days.

(21) Appl. No.: 10/125,235

(22) Filed: Apr. 17, 2002

(65) Prior Publication Data

US 2003/0196937 A1 Oct. 23, 2003

(51) Int. Cl.[7] .............................. B07C 5/00; G06K 9/00

(52) U.S. Cl. .......................... 209/584; 209/900; 436/48

(58) Field of Search ................................ 209/584, 900, 209/688

(56) References Cited

U.S. PATENT DOCUMENTS 6,613,571 B2 * 9/2003 Cordery et al. ............... 436/48

* cited by examiner

*Primary Examiner*—Donald P. Walsh
*Assistant Examiner*—Jonathan R Miller
(74) *Attorney, Agent, or Firm*—Brian A. Lemm; Angelo N. Chaclas

(57) ABSTRACT

A contaminant detection system for mail is provided. A mail piece enters the system according to the present invention and a probe is inserted into the mail piece. An extraction device, such as, for example, a vacuum system, extracts a sample of air, including any dust and other particles, from inside the mail piece. The extracted sample is provided to a sampling system that monitors for the presence of a possible contaminant. If any type of contaminant is found in the sampled air, dust and other particles, a signal can be provided to alert an operator of contaminant detection and the mail piece can be diverted and held for further investigation. If no contaminants are detected, the mail piece is accepted and delivered to a normal processing path.

12 Claims, 3 Drawing Sheets

METHOD AND SYSTEM FOR DETECTION OF CONTAMINANTS IN MAIL

FIELD OF THE INVENTION

The invention disclosed herein relates generally to the processing of mail, and more particularly to a method and system to detect possible contaminants contained within a mail piece.

BACKGROUND OF THE INVENTION

The United States currently has the world's largest postal system, which handles billions of pieces of mail each year. The servicing of mail delivery involves three general steps: collection, sorting, and delivery. Collection takes place through a series of local post office facilities and Bulk Mail Entry Units (BMEU) spread throughout the United States. The mail is then sent from local post offices or BMEUs to central facilities known as sectional centers. At the sectional centers, high speed automated equipment sorts the large volumes of mail based on the destination post office or zip code for delivery.

Recently, the postal system has been used as a weapon of terror and fear by the inclusion of harmful chemical or biological contaminants, such as, for example, the spore-forming bacterium *Bacillus anthracis* (anthrax), within or on a mail piece. Such contaminants can be carried in several forms, including for example, a powder form. The harmful effects of only a few contaminated mail pieces can be far reaching, as cross-contamination of other mail pieces can easily occur when the mail pieces come in contact with each other or are passed through the same machines during sorting. The Centers for Disease Control and Prevention estimates that tens of thousands of mail pieces could have become cross-contaminated from only two contaminated mail pieces.

Ideally, it would be desirous for the postal authority to examine and/or test each piece of mail individually for any possible contamination before it enters the mail system, thereby isolating any contaminated mail pieces and preventing any cross-contamination. With the large volume of mail processed daily, however, such an approach is not feasible due to the time and cost that such an undertaking would entail.

In addition, a business or company that receives large amounts of mail delivered by the postal authority has an interest in ensuring the safety of their employees, including the personnel handling the mail for internal delivery and the intended recipient. Ideally, it would be advantageous for a business or company to examine and/or test each piece of mail individually for any possible contamination before it is delivered internally, thereby isolating any contaminated mail pieces and preventing any cross-contamination. To be effective, however, such a system must be economical and easy to implement and operate. Currently, the only type of system for such examination requires mail room personnel to open and visually inspect each piece of mail before it is delivered internally to the intended recipient. This potentially requires an extensive amount of time, as well as higher level of risk associated with such manual opening and visual inspection.

Thus, there exists a need for a method and system that allows large volumes of mail pieces to be automatically tested for any possible contaminants in a relatively short time and in a manner similar to existing to mail handling.

SUMMARY OF THE INVENTION

The present invention alleviates the problems associated with the prior art and provides a method and system that allows large volumes of mail pieces to be automatically tested for any possible contaminants in a relatively short time and in a manner similar to existing to mail handling.

In accordance with the present invention, an automatic contaminant detection system for pieces of mail is provided. A mail piece enters the system according to the present invention and a probe is inserted into the mail piece at a pre-determined location. An extraction device, such as, for example, a vacuum system, extracts a sample of air, including dust and other particles, from inside the mail piece. The extracted sample is provided to a sampling system that monitors for the presence of a possible contaminant. If any type of contaminant is found in the sampled air, a signal can be provided to alert an operator of contaminant detection and the mail piece can be diverted and held for further investigation. If no contaminants are detected, the mail piece is accepted and delivered to a normal processing path.

DESCRIPTION OF THE DRAWINGS

The above and other objects and advantages of the present invention will be apparent upon consideration of the following detailed description, taken in conjunction with accompanying drawings, in which like reference characters refer to like parts throughout, and in which.

DETAILED DESCRIPTION OF THE PRESENT INVENTION

Figure 1:
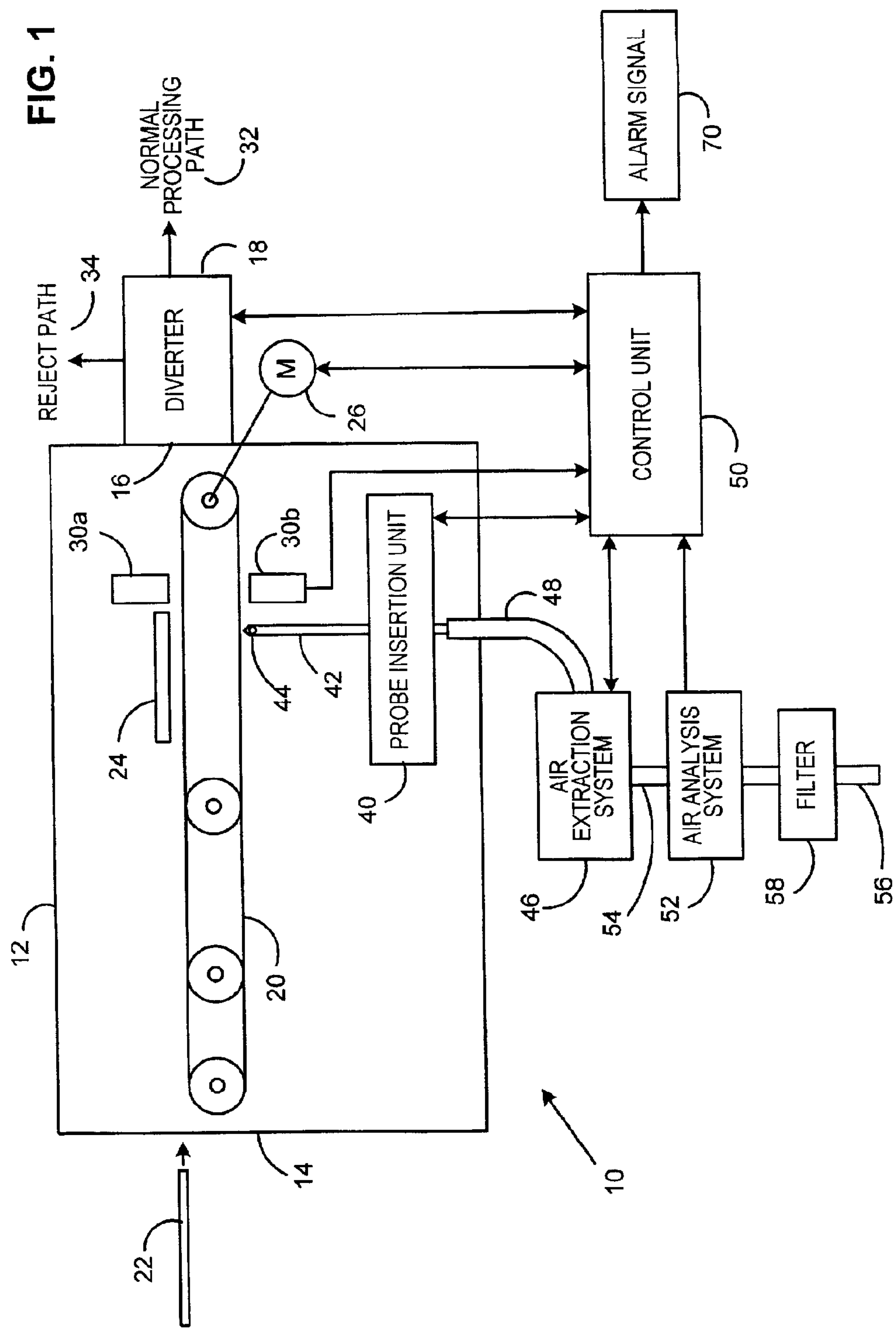
FIG. 1 illustrates in block diagram form a contaminant detection system according to the present invention before a mail piece has entered.

In describing the present invention, reference is made to the drawings, wherein there is seen in FIG. 1 a system 10 for contaminant detection according to the present invention. Such contaminants could include, for example, biological or chemical contaminants. System 10 includes a control unit 50 for controlling operation of the system 10. Control unit 50 could be, for example, a general purpose processor or an application specific integrated circuit (ASIC). Preferably, control unit 50 is a self-contained sealed unit or sufficiently isolated such that if a contaminated mail piece is detected, control unit 50 will not be cross-contaminated. System 10 preferably includes a test chamber 12 having an inlet side 14 and an outlet side 16. Test chamber 12 is utilized to reduce exposure to air and dust particles that may escape from a mail piece 22 during testing as described below. Test chamber 12 is preferably designed such that it can be easily decontaminated should a contaminated mail piece be detected. A diverter 18 is coupled to the outlet side of chamber 12, or alternatively, diverter 18 could be integral with test chamber 12. Diverter 18 will pass a mail piece to either a normal processing path 32 or a reject path 34 based on signals received from control unit 50 as will be further described below.

A transport 20 is utilized to transport a mail piece 22 received at the inlet side 14 through chamber 12. Transport 20 could be, for example, a belt/roller combination as illustrated, or any other type of transport as is known in the art. The movement of transport 20 is controlled by a motor 26 based on signals received from control unit 50. A corresponding pair of sensors 30*a*, 30*b* are located along the transport 20 for detection of a mail piece 22 on transport 20.

A probe insertion unit 40 controls the insertion of a probe 42 into a mail piece 22 detected by sensors 30*a*, 30*b*. Probe 42 may be, for example, a needle with sufficient strength and rigidity to penetrate mail piece 22. Preferably, a backplate 24 is provided to oppose the force of probe 42 on the mail piece 22 to ensure penetration of the probe 42 into mail piece 22. Probe 42 is provided with an opening 44 near the penetration end through which air extraction system 46 can extract a sample of air, including dust and other particles, from a mail piece 22 via tube 48. The sample extracted by air extraction system 46 is passed to air analysis system 52 via tube 54. Alternatively, air analysis system 52 and air extraction system 46 may be integrated as a single unit. Air analysis system 52 is coupled to control unit 50 to provide data pertaining to the analysis results of the extracted sample.

Figure 2:
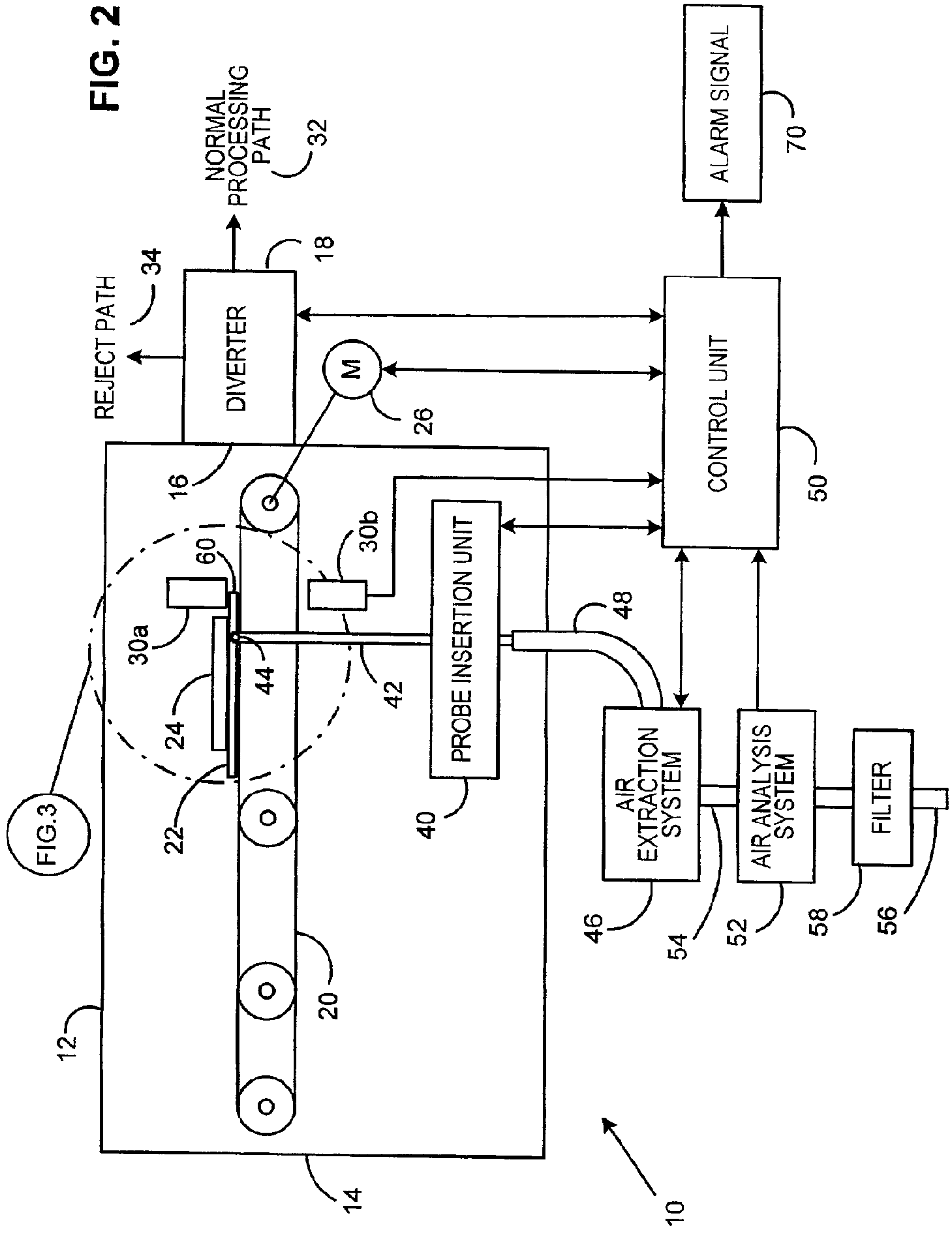
FIG. 2 illustrates in block diagram form the contaminant detection system according to the present invention after a mail piece has entered.
Figure 3:
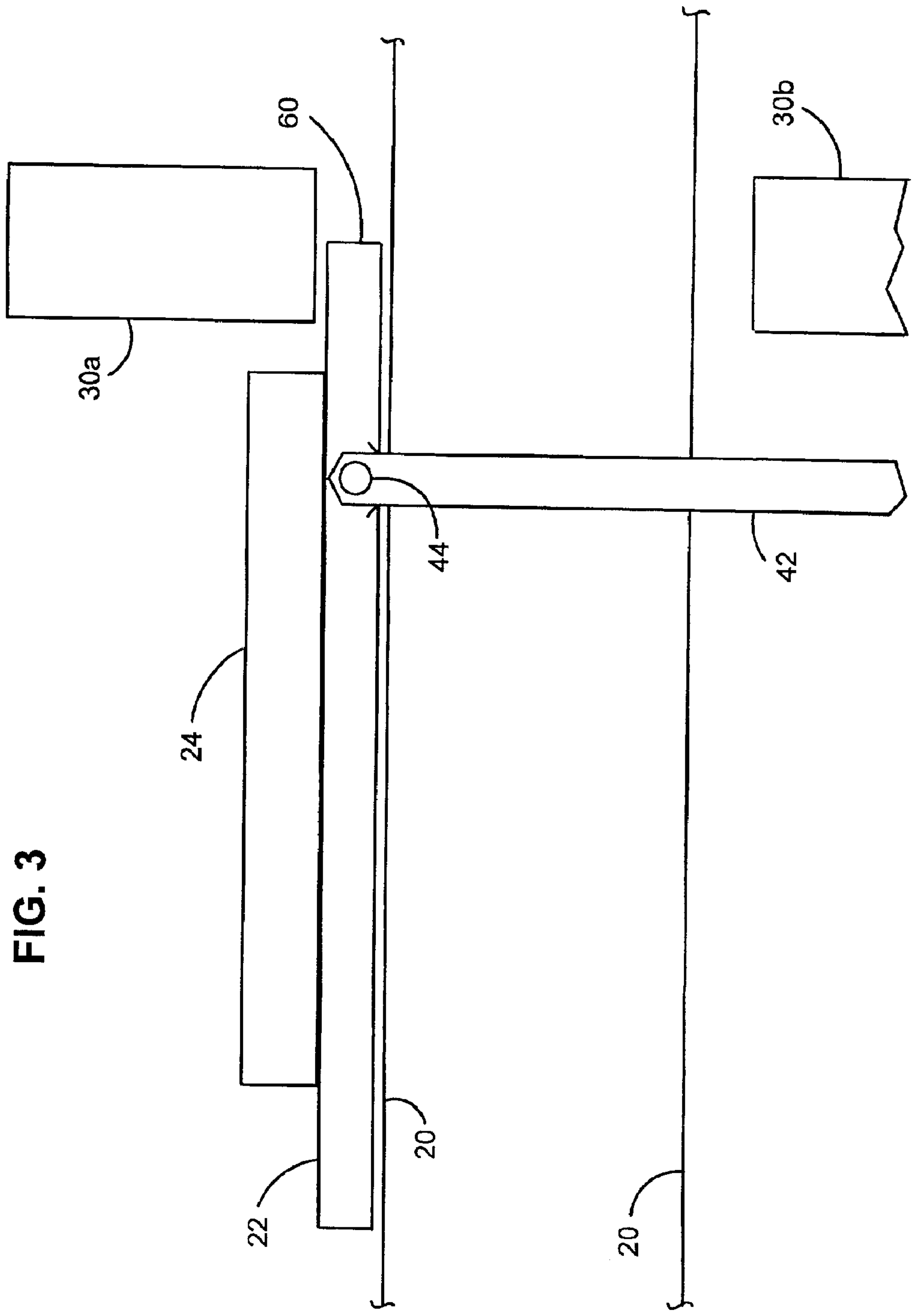
FIG. 3 illustrates an exploded view of a portion of FIG. 2.

The operation of system 10 will now be described with respect to FIG. 2. When the leading edge 60 of mail piece 22 is detected by sensors 30*a*, 30*b*, a signal is sent to control unit 50 which then sends a signal to motor 26 to halt motion of transport 20. Accordingly, transport 20 is stopped such that at least a portion of mail piece 22 is adjacent to the probe 42. When the mail piece 22 has sufficiently decelerated or come to a complete stop, the control unit 50 sends a signal to probe insertion unit 40 to move the probe 42 towards the mail piece 22 and thereby penetrate the mail piece 22 as illustrated in FIG. 3. Preferably, probe 42 penetrates the mail piece 22 near a corner of the mail piece 22, as loose particulate matter, such as, for example, a powdery substance, would tend to accumulate and settle in the corners of the mail piece 22. After penetration by probe 42, at least a portion of the opening 44 of probe 42 must be inside the mail piece 22. As noted above, a backplate 24 may be provided to oppose the force of the probe 42 on the mail piece 22 and ensure penetration of the probe 42 into mail piece 22.

Once the probe 42 has been inserted into the mail piece 22, air extraction system 46 is activated and a sample of air, including any dust and other particles, are removed from inside the mail piece 22. Air extraction system 46 may be, for example, a vacuum system. The air extraction system 46 draws the sample from the inside of mail piece 22 through the opening 44 in probe 42, via tube 48, and passes it to air analysis system 52 via tube 54. Once the sample has been extracted from mail piece 22, the probe insertion unit 40 removes the probe 42 from the mail piece 22.

Air analysis system 52 analyzes the extracted air, including any dust and other particles, to detect any type of contaminants, such as, for example, a bio-hazardous material, including, for example, anthrax, or chemical material, including, for example, explosives. Air analysis system 52 can, for example, analyze the extracted air, dust and other particles for the presence of excessive aerosol, i.e., floating particles, indicating possible contaminants in an aerosolized form. Additionally, air analysis system 52 could analyze the extracted air, dust and other particles for particular contaminants. For example, air analysis system 52 could utilize optical or electrostatic characteristics to determine if a particular contaminant is present. It should be understood that the above are examples only, and any type of detection system for contaminants can be utilized with the present invention. Air analysis system 52 can determine if any type of contaminant is present in the sample extracted from mail piece 22 based on the results of the analyzed sample. Alternatively, air analysis system 52 can pass the data obtained from the analyzed sample to the control unit 50, and control unit 50 can determine if any type of contaminant is present in the sample.

Preferably, the exhaust 56 from air analysis system 52 is passed through a blocking filter 58, such as, for example, a High Efficiency Particle Arresting (HEPA) filter, that removes the majority of harmful particles, including dust and spores, from the air taken from within mail piece 22. Optionally, filter 58 can also incorporate a biocide to kill any type of microorganisms or other biological contaminants that are collected by air extraction system 46 and analyzed by air analysis system 52.

If air analysis system 52 determines that no excessive aerosol is detected, or the particular contaminants being tested for are not detected in the extracted sample, then a signal is sent to control unit 52 indicating acceptance of the mail piece 22. Thus, when the mail piece 22 is passed to diverter 18, control unit 50 will cause diverter 18 to pass the mail piece 22 to the normal processing path 32 for further processing and delivery. If air analysis system 52 determines that an excessive amount of aerosol is present, or that one or more of the particular contaminants being tested for are detected in the extracted sample, then a signal is sent to control unit 50 indicating that mail piece 22 may contain a possible contaminant. Thus, when the mail piece 22 is passed to diverter 18, control unit 50 will cause diverter 18 to pass the mail piece 22 to the reject path 34 for further investigation of the mail piece 22. Optionally, control unit 50 could cause alarm signal 70 to operate to indicate to an operator that a mail piece is being diverted to reject path 34. Alarm signal 70 could be any type of audio and or/visual signaling device. Alternatively, alarm signal 70 could be coupled to a communication system (not shown), such as, for example, a network, to provide notification of a diverted mail piece electronically to a remote station. Of course, if control unit 50 is making a determination as to the presence of an excessive amount of aerosol or one or more of the particular contaminants based on data from the air analysis system 52, then it is not necessary for air analysis system 52 to send an acceptance or rejection signal to control unit 50, as control unit 50 will simply cause diverter 18 to operate in accordance with its determination.

By utilizing the system 10 according to the present invention, large volumes of mail pieces can be automatically tested for any possible contaminants in a relatively short time and in a manner similar to existing to mail handling, while significantly reducing exposure to personnel. Additionally, by utilizing the system 10 according to the present invention upon mail acceptance and before sending the mail pieces through processing equipment, such as, for example, sorting equipment, of a normal mail processing path, cross-contamination of the processing equipment, and any subsequent mail pieces that pass through the processing equipment, can be prevented.

It should be understood that the present invention can be utilized in any application in which a large amount of mail is processed, such as, for example, within a postal system upon induction of the mail or within a business or company that receives large amounts of mail upon receipt of the mail. By utilizing the present invention at mail acceptance, either at a postal facility or a business, prior to sorting the mail for delivery, contamination of the sorting and processing machines, as well as cross-contamination of any other mail pieces, can be prevented.

While preferred embodiments of the invention have been described and illustrated above, it should be understood that they are exemplary of the invention and are not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. In a mail processing system having a plurality of processing paths, a method for testing a mail piece for a contaminant comprising transporting the mail piece along a first processing path;

detecting the mail piece at a predetermined location along the first processing path;

stopping the mail piece near the predetermined location;

penetrating the mail piece with at least a portion of a probe;

collecting a sample of air from within the mail piece utilizing the probe;

analyzing the sample of air from within the mail piece to determine if a contaminant may be present;

passing the mail piece from the first processing path to a normal processing path if it is determined that a contaminant is not present in the mail piece; and diverting the mail piece from the first processing path to a reject processing path if it is determined that a contaminant is present in the mail piece.

2. The method according to claim 1, wherein the step of collecting further comprises:

using a vacuum system to collect the sample.

3. The method according to claim 1, wherein the step of analyzing further comprises:

analyzing the sample for an aerosol.

4. The method according to claim 1, wherein the step of analyzing further comprises:

analyzing the sample for a specific contaminant.

5. The method according to claim 1, further comprising:

activating a signal alarm to indicate the mail piece is being diverted to the reject processing path.

6. A system for testing a mail piece for a contaminant comprising:

a first processing path upon which a mail piece is transported;

a probe located along the first processing device for penetrating the mail piece;

an extraction device coupled to the probe to extract a sample from within the mail piece through the probe;

an analysis device coupled to the extraction device to receive and analyze the sample taken from within the mail piece for a contaminant;

a control unit coupled to the analysis device, the control unit receiving data based on the analysis performed by the analysis device;

a diverter coupled to the control unit, the diverter having an input coupled to an outlet of the first processing path, the diverter having a plurality of outlets;

a normal processing path having an input coupled to a first outlet of the diverter; and a reject processing path having an input coupled to a second outlet of the diverter;

wherein the controller will cause the diverter to pass the mail piece from the first processing path to the normal processing path if it is determined that a contaminant is not present in the mail piece and to divert the mail piece from the first processing path to the reject processing path if it is determined that a contaminant is present in the mail piece.

7. The system according to claim 6, wherein the extraction device further comprises:

a vacuum to draw the sample from inside the mail piece.

8. The system according to claim 6, wherein the analysis device analyzes the sample for an aerosol.

9. The system according to claim 6, wherein the analysis device analyzes the sample for a particular contaminant.

10. The system according to claim 6, further comprising:

at least one sensor located along the first processing path to detect the mail piece along the first processing path, wherein when the at least one sensor detects the mail piece at a predetermined location along the first processing path, the mail piece is stopped along the first processing path such that at least a portion of the mail piece is adjacent to the probe.

11. The system according to claim 10, further comprising:

a test chamber surrounding at least a portion of the first processing path.

12. The system according to claim 6, further comprising:

an alarm device coupled to the control unit, wherein if a mail piece is diverted to the reject processing path, the control unit signals the alarm device to operate.

* * * * *